(12) United States Patent
Grablowitz et al.

(10) Patent No.: US 7,972,982 B2
(45) Date of Patent: Jul. 5, 2011

(54) AQUEOUS DISPERSION OF ANIONICALLY MODIFIED POLYURETHANE UREAS FOR COATING A SHEET-FORM TEXTILE MATERIAL

(75) Inventors: Hans Georg Grablowitz, Neuss (DE); Thorsten Rische, Unna (DE); Thomas Feller, Solingen (DE); Hans-Peter Klee, Burscheid (DE); Juergen Urban, Bergisch Gladbach (DE); Eva Urban, legal representative, Köln (DE); Anne Urban, legal representative, Köln (DE); Holger Casselmann, Odenthal (DE); Alfred Zastrow, Dormagen (DE); Thomas Michaelis, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/401,956

(22) Filed: Mar. 11, 2009

(65) Prior Publication Data

US 2009/0239431 A1    Sep. 24, 2009

(30) Foreign Application Priority Data

Mar. 14, 2008 (DE) .......................... 10 2008 014 211

(51) Int. Cl.
*B32B 27/12* (2006.01)
*B32B 27/04* (2006.01)

(52) U.S. Cl. ...................... 442/148; 442/149; 428/423.1

(58) Field of Classification Search .......... 442/148–149, 442/103–104, 97, 101; 428/160, 343, 423.1
See application file for complete search history.

(56) References Cited

U.S. PATENT DOCUMENTS

| | | |
|---|---|---|
| 3,479,310 A | 11/1969 | Dieterich et al. |
| 4,048,001 A | 9/1977 | Remley |
| 4,108,814 A | 8/1978 | Reiff et al. |
| 4,192,937 A | 3/1980 | Noll et al. |
| 4,269,748 A | 5/1981 | Nachtkamp et al. |
| 4,292,226 A | 9/1981 | Wenzel et al. |
| 4,387,181 A | 6/1983 | Brown et al. |
| 4,829,122 A | 5/1989 | Pedain et al. |
| 5,770,264 A * | 6/1998 | Munzmay et al. ............ 427/323 |
| 6,713,131 B2 | 3/2004 | Blackwood et al. |
| 2002/0033468 A1* | 3/2002 | Huang ........................ 252/8.57 |
| 2005/0009426 A1* | 1/2005 | Hwang et al. ................... 442/59 |

FOREIGN PATENT DOCUMENTS

| | | |
|---|---|---|
| CA | 2253119 A1 | 5/1999 |
| DE | 1495745 | 6/1969 |
| DE | 2446440 A | 4/1976 |
| DE | 2725589 A1 | 12/1978 |
| EP | 0581159 A1 | 7/1993 |
| EP | 0 595 149 A1 | 5/1994 |
| EP | 0916647 A2 | 5/1999 |
| WO | WO 99/23129 A1 | 5/1999 |

* cited by examiner

*Primary Examiner* — Lynda Salvatore

(74) *Attorney, Agent, or Firm* — Connolly Bove Lodge & Hutz LLP

(57) ABSTRACT

The invention relates to a method for coating sheet-form textile materials, in which there is applied to a sheet-form textile material an aqueous dispersion containing anionically modified polyurethane ureas comprising (A) aromatic diisocyanate, (B) polyether polyol having a mean molecular weight greater than 1500, (C) at least one compound containing from 1 to 2 isocyanate-reactive groups and at least one ionogenic group, (D) polyamine having a mean molecular weight of at least 32, and (E) water, wherein the mean total functionality of the isocyanate-reactive compounds B to D is from 1.85 to 2.2, the molar ratio of the isocyanate groups of component A to the isocyanate-reactive groups of components B to D is greater than 1, and the polyurethane ureas have a content of from 800 to 1500 mmol of urethane groups/kg of anionically modified polyurethane urea and a content of from 800 to 1800 mmol of urethane plus urea groups/kg of anionically modified polyurethane urea.

14 Claims, No Drawings

US 7,972,982 B2

AQUEOUS DISPERSION OF ANIONICALLY MODIFIED POLYURETHANE UREAS FOR COATING A SHEET-FORM TEXTILE MATERIAL

RELATED APPLICATIONS

This application claims benefit to German Patent Application No. 10 2008 014 211.5, filed Mar. 14, 2008, which is incorporated herein by reference in its entirety for all useful purposes.

BACKGROUND OF THE INVENTION

The invention relates to a method for coating a sheet-form textile material with an aqueous polyurethane urea dispersion. The invention relates further to the use of an aqueous polyurethane urea dispersion in the coating of a sheet-form textile material.

It has for a long time been part of the prior art to coat textiles, such as woven fabrics, knitted fabrics and nonwovens, with solutions of polyurethanes by the direct or reverse process. The articles obtained thereby are used, for example, in the manufacture of outer clothing, upholstery, bags, shoe uppers, tarpaulins, awnings and many other products.

Because of their particular properties, such as resilience and low-temperature flexibility, polyurethanes play an important part in the coating of sheet-form textile materials. Owing to increasing ecological demands, aqueous polyurethane dispersions are nowadays increasingly being used in order to reduce solvent emission. An overview of the various types and preparation processes is to be found in Houben-Weyl: "Methoden der organischen Chemie, Vol. E20, pages 1659 to 1692" or in "Ullmann's Encyclopaedia of Industrial Chemistry" (1992), Vol. A21, pages 667-682. Hereinbelow, the term polyurethane dispersions also refers to those dispersions that also contain urea groups in addition to the urethane groups.

A multilayer structure is very often used in the coating of textiles in order to impart the desired properties to the product. At the same time, each of the individual layers fulfils a particular function. The coating often consists of at least two layers, which are generally also referred to as coats. The uppermost layer facing the air is referred to as the top coat and is to render the surface as robust as possible against chemical and physical influences from the outside. These include, for example, properties such as resistance to hydrolysis and solvents, scratch resistance, a velvety or smooth surface, etc. The lowermost layer, facing the substrate, which joins the top coat to the textile, is also referred to as the adhesive coat. This layer must exhibit good adhesion on the one hand to the textile and on the other hand to the adhesive coat. A high degree of wet adhesion of the top coat is required, inter alia, because textiles can frequently come into contact with water.

Hitherto, polyurethane solutions have conventionally been used in the prior art as the adhesive coat. Such polyurethanes must not contain any internal and/or external hydrophilic structural units, which increases their wet adhesion. However, the use of organic solvents is increasingly undesirable for economic and, in particular, also ecological reasons.

In contrast thereto, polyurethanes that are used in aqueous polyurethane dispersions conventionally contain hydrophilic structural units in order to ensure that the polyurethane is dispersible in water. The hydrophilic structural units can be ionic and/or non-ionic. In the case of adhesive coats, however, the use of such polyurethanes has not been successful because the hydrophilic structural units lead to swelling of the polyurethane in water, and the adhesion of the coating is accordingly reduced. In the worst case, this can result in delamination.

Accordingly, it would be desirable to obtain polyurethanes that can be used in aqueous dispersions and nevertheless exhibit a high degree of adhesion.

From U.S. Pat. No. 6,713,131 B2 there is known a process for coating a substrate in which aqueous poly(isobutylene-co-paramethylstyrene) emulsions which have been functionalised by dimethyloxysilyl groups are applied to a polyamide together with other non-functional polyurethane dispersions. In order to emulsify the silylated polyurethanes in water, they contain external emulsifiers, which bring about a reduction in the wet adhesion. As discussed above, the presence of the external emulsifiers as hydrophilic structural units causes swellability of the polyurethane, which impairs the wet adhesion. This is counteracted by the polyurethanes containing self-crosslinking components that are reactive with the silyl groups, which improve the wet adhesion. However, silylated polyurethanes have the disadvantage that they are cost-intensive components. In addition, so-called VOCs (volatile organic compounds) are released when they are used—which is known to be undesirable from ecological points of view.

WO 99152676 A1 describes sulfone-group-containing polyester urethanes having terminal silyl groups. The polyester urethanes likewise contain hydrophilic groups, have been silyl-functionalised and are used in the form of an aqueous dispersion. They are used, for example, as an adhesive coat for abrasive belts. The polyurethanes described here are also functional reagents that crosslink on drying, whose swellability is compensated for in that manner. These compounds again have the disadvantage of a high price and poor environmental compatibility.

The object of the present invention is to provide a method for coating sheet-form textile materials in which polyurethanes are used in the form of an aqueous dispersion and with which there are obtained coated sheet-form textile materials which nevertheless exhibit high wet adhesion. In addition, the polyurethanes used are to be inexpensive to prepare and environmentally harmless.

EMBODIMENTS OF THE INVENTION

An embodiment of the present invention is a method for coating a sheet-form textile material, comprising applying an aqueous dispersion which comprises an anionically modified polyurethane urea prepared from
  A. an aromatic diisocyanate;
  B. a polyether polyol having a mean molecular weight of greater than 1500;
  C. at least one compound containing from 1 to 2 isocyanate-reactive groups and at least one ionogenic group;
  D. a polyamine having a mean molecular weight of at least 32; and
  E. water;
wherein the mean total functionality of B, C, and D is in the range of from 1.85 to 2.2, the molar ratio of the isocyanate groups of A to the isocyanate-reactive groups of B, C, and D is greater than 1, and said anionically modified polyurethane urea contains in the range of from 800 to 1500 mmol of urethane groups/kg of anionically modified polyurethane urea and in the range of from 800 to 1800 mmol of urethane plus urea groups/kg of anionically modified polyurethane urea;
  to a sheet-form textile material.

Another embodiment of the present invention is the above method, wherein said anionically modified polyurethane urea contains in the range of from 1200 to 1750 mmol of urethane plus urea groups/kg of anionically modified polyurethane urea.

Another embodiment of the present invention is the above method, wherein said anionically modified polyurethane urea contains more than 150 mmol of urea groups/kg of anionically modified polyurethane urea.

Another embodiment of the present invention is the above method, wherein said anionically modified polyurethane urea contains more than 200 mmol of urea groups/kg of anionically modified polyurethane urea.

Another embodiment of the present invention is the above method, wherein the molar ratio of the isocyanate groups of A to the isocyanate-reactive groups of B, C, and D is greater than 1.05.

Another embodiment of the present invention is the above method, wherein said anionically modified polyurethane urea has a Shore A hardness of not more than 60.

Another embodiment of the present invention is the above method, wherein said aqueous dispersion has a solids content of from 30 to 50 weight %.

Another embodiment of the present invention is the above method, wherein said aqueous dispersion has a solids content of from 35 to 45 weight %.

Another embodiment of the present invention is the above method, further comprising curing said aqueous dispersion at a temperature in the range of from 70° C. to 160° C. to form an adhesive coat.

Another embodiment of the present invention is the above method, further comprising applying a top coat to the side of said adhesive coat that is remote from the sheet-form textile material.

Another embodiment of the present invention is the above method, wherein said aqueous dispersion is applied to said sheet-form textile material by direct coating, reverse coating, lamination, atomisation, immersion, printing, spraying, and/or knife coating.

Another embodiment of the present invention is the above method, wherein said aqueous dispersion further comprises crosslinkers and/or curing agents, fillers, flameproofing agents, flow improvers, surface-active compounds, stabilisers, biocides, and/or thickeners.

Another embodiment of the present invention is the above method, wherein said sheet-form textile material is a woven fabric, a nonwoven fabric, or a knitted fabric.

Yet another embodiment of the present invention is a coating on a sheet-form textile material comprising the anionically modified polyurethane urea prepared from
  A. an aromatic diisocyanate;
  B. a polyether polyol having a mean molecular weight of greater than 1500;
  C. at least one compound containing from 1 to 2 isocyanate-reactive groups and at least one ionogenic group;
  D. a polyamine having a mean molecular weight of at least 32; and
  E. water;
wherein the mean total functionality of B, C, and D is in the range of from 1.85 to 2.2, the molar ratio of the isocyanate groups of A to the isocyanate-reactive groups of B, C, and D is greater than 1, and said anionically modified polyurethane urea contains from 800 to 1500 mmol of urethane groups/kg of anionically modified polyurethane urea and from 800 to 1800 mmol of urethane plus urea groups/kg of anionically modified polyurethane urea.

DESCRIPTION OF THE INVENTION

The object is achieved by a method for coating sheet-form textile materials in which there is applied to a sheet-form textile material an aqueous dispersion containing anionically modified polyurethane ureas comprising
  A. aromatic diisocyanate,
  B. polyether polyol having a mean molecular weight greater than 1500,
  C. at least one compound containing from 1 to 2 isocyanate-reactive groups and at least one ionogenic group,
  D. polyamine having a mean molecular weight of at least 32, and
  E. water,
wherein the mean total functionality of the isocyanate-reactive compounds B to D is from 1.85 to 2.2, the molar ratio of the isocyanate groups of component A to the isocyanate-reactive groups of components B to D is greater than 1, and the polyurethane ureas have a content of from 800 to 1500 mmol of urethane groups/kg of anionically modified polyurethane urea and a content of from 800 to 1800 mmol of urethane plus urea groups/kg of anionically modified polyurethane urea.

Suitable polyurethane ureas for use in the present invention include those disclosed in EP 0 581 159 B1. In particular in respect of the structure, properties and preparation of the anionically modified polyurethane ureas, reference is made expressly to the disclosure of EP 0 581 159 B1. That publication describes the use of aqueous polyurethane urea dispersions in the coating of leather.

Surprisingly, it has been found that the anionically modified polyurethane ureas of EP 0 581 159 B1 can be used in the form of an aqueous dispersion for coating sheet-form textile materials, the coated sheet-form textile materials thereby obtained having excellent wet adhesion. In addition, the anionically modified polyurethane ureas used in the method according to the invention have a low urethane and/or urea group content and are flexible and non-tacky, while having good adhesion. A further advantage is that these polyurethane ureas nevertheless have high strength and can be prepared inexpensively and in a manner that is harmless to the environment.

By means of the method according to the invention it is possible to produce in a simple manner coated sheet-form textile materials which exhibit excellent wet adhesion. The use of the method according to the invention is particularly advantageous in the production of laminates comprising at least two coats. On account of its excellent adhesion-promoting action, the layer formed from the anionically modified polyurethane ureas advantageously serves as the adhesive coat.

According to the invention, a very wide variety of sheet-form textile materials can be coated with the anionically modified polyurethane ureas. Practical tests have shown that particularly good results are obtained in the coating of woven fabrics, nonwovens or knitted fabrics. Nonwovens filled with microporously produced coagulates are also outstandingly suitable.

According to the invention, the polyurethane ureas used for the coating have a content of from 800 to 1800 mmol of urethane plus urea groups/kg of anionically modified polyurethane urea. According to a preferred embodiment of the invention, the content of urethane plus urea groups/kg of anionically modified polyurethane urea is from 1000 to 1800 mmol, more preferably from 1200 to 1750 mmol and in particular from 1400 to 1700 mmol.

According to the invention, the molar ratio of the isocyanate groups of component A to the isocyanate-reactive groups of components B to D is more than 1. According to a preferred embodiment of the invention, the molar ratio of the isocyanate groups of component A to the isocyanate-reactive groups of components B to L is greater than 1.05.

According to a further preferred embodiment of the invention, the polyurethane ureas have a content of more than 150 mmol, preferably more than 200 mmol and in particular more than 320 mmol/g, and most particularly preferably more than 360 mmol of urea groups/kg of anionically modified polyurethane urea.

According to a further preferred embodiment the polyurethane ureas have a Shore A hardness of not more than 60.

According to the invention, aromatic diisocyanates are used as component A. Practical tests have shown that the diisocyanates described by W. Siefken in Justus Liebigs Annalen der Chemie, 562, pages 75 to 136 are particularly suitable aromatic diisocyanates for the method according to the invention. Particular mention is to be made of aromatic diisocyanates or diisocyanate mixtures having lateral alkyl groups, for example 2,4- and 2,6-toluoylene diisocyanates.

Excellent results are achieved in particular with 1,4-phenylene diisocyanate, 2,4-and/or 2,6-toluoylene diisocyanate, 1,5-naphthylene diisocyanate, 2,4'- or 4,4'-diphenylmethane diisocyanate, 1,3- and 1,4-bis-(2-isocyanato-prop-2-yl)-benzene (TMXDI), 1,3-bis(isocyanato-methyl)benzene (XDI).

Diisocyanates having a functionality $\geqq 2$ can also be used. These include modified diisocyanates having a uretdione, isocyanurate, urethane, allophanate, biuret, iminooxadiazinedione and/or oxadiazinetrione structure as well as unmodified polyisocyanates having more than 2 NCO groups per molecule, for example triphenylmethane 4,4',4''-triisocyanate. Diisocyanates having a functionality $\geqq 2$ are preferably used only proportionally.

Preference is given to diisocyanates or diisocyanate mixtures of the above-mentioned type having a mean functionality of from 2 to 4, preferably from 2 to 2.6 and particularly preferably from 2 to 2.4.

According to the invention, polyether polyols having a mean molecular weight of more than 1500 are used as component B. The polyether polyols preferably have molecular weights of from 1800 to 3000. Their mean functionality is preferably greater than 1.85, preferably from 2 to 3. Low molecular weight polyether polyols can be water-soluble at correspondingly high OH contents. Particular preference is given, however, to water-insoluble polypropylene oxide polyols and polytetramethylene oxide polyols as well as mixtures thereof.

There have been found to be particularly suitable the polyaddition products of styrene oxides, ethylene oxide, propylene oxide, tetrahydrofuran, butylene oxide, epichlorohydrin and their mixed addition and graft products, as well as the polyether polyols obtained by condensation of polyhydric alcohols or mixtures thereof and those obtained by alkoxylation of polyhydric alcohols, amines and amino alcohols.

Particularly suitable hydroxy-functional polyethers have OH functionalities of from 1.8 to 6.0, preferably from 2.0 to 4.0, OH numbers from 50 to 700, preferably from 100 to 600, mg KOH/g of solid, such as, for example, alkoxylation products of hydroxy-functional starter molecules such as ethylene glycol, propylene glycol, butanediol, hexanediol, trimethylolpropane, glycerol, pentaerythritol, sorbitol or mixtures of these and other hydroxy-functional compounds with propylene oxide or butylene oxide.

According to the invention there are used as component C compounds that contain from 1 to 2 isocyanate-reactive groups and at least one ionogenic group and that act in particular as hydrophilising agents. The ionogenic groups can in principle be either cationic or anionic in nature. Compounds having a cationically or anionically dispersing action are those which contain, for example, sulfonium, ammonium, phosphonium, carboxylate, sulfonate, phosphonate groups or groups which can be converted into the above-mentioned groups by salt formation (potentially ionic groups). Suitable isocyanate-reactive groups are preferably hydroxyl and amine groups.

Suitable ionic or potentially ionic compounds are, for example, mono- and di-hydroxycarboxylic acids, mono- and di-aminocarboxylic acids, mono- and di-hydroxysulfonic acids, mono- and di-aminosulfonic acids and also mono- and di-hydroxyphosphonic acids or mono- and di-aminophosphonic acids and salts thereof, such as dimethylolpropionic acid, dimethylolbutyric acid, hydroxypivalic acid, 2-(2-amino-ethylamino)-ethane-sulfonic acid, ethylenediamine-propyl- or -butyl-sulfonic acid, malic acid, citric acid, glycolic acid, lactic acid, glycine, alanine, taurine, lysine, 3,5-diaminobenzoic acid, an addition product of IPDI and acrylic acid (EP 0 916 647, Example 1) and alkali and/or ammonium salts thereof; the adduct of sodium bisulfite with 2-butene-1, 4-diol, polyether sulfonate, the propoxylated adduct of 2-butenediol and NaHSO$_3$, for example described in DE-A 2 446 440 (pages 5-9, formulae I-III), and also structural units which can be converted into cationic groups, such as N-methyl-diethanolamine as hydrophilic chain-extension components. Preferred ionic or potentially ionic compounds are those which have carboxy or carboxylate and/or sulfonate groups and/or ammonium groups. Particularly preferred ionic compounds are those which contain carboxyl and/or sulfonate groups as ionic or potentially ionic groups, such as the salts of 2-(2-amino-ethylamino)-ethanesulfonic acid or the addition product of IPDI and acrylic acid (EP-A 0 916 647, Example 1) and dimethylolpropionic acid.

According to the invention there are used as component D polyamines having a mean molecular weight of at least 32. The polyamines serve in particular as chain extenders. According to the invention, the term polyamines is understood as meaning both diamines and polyamines in the actual sense. Particularly suitable polyamines according to the invention are ethylenediamine, 1,2- and 1,3-diaminopropane, 1,4-diaminobutane, 1,6-diaminohexane, isophoronediamine, an isomer mixture of 2,2,4- and 2,4,4-trimethylhexamethylenediamine, 2-methylpentamethylenediamine, diethylenetriamine, 4,4-diaminodicyclohexylmethane, dimethylethylenediamine, hydrazine or adipic acid dihydrazide.

In principle, there come into consideration as component D also polyamines that contain active hydrogen of differing reactivity towards NCO groups, such as compounds that contain, in addition to a primary amino group, also secondary amino groups or, in addition to an amino group (primary or secondary), also OH groups. Examples thereof are primary/secondary amines, such as 3-amino-1-methyl-aminopropane, 3-amino-1-ethylaminopropane, 3-amino-1-cyclohexylaminopropane, 3-amino-1-methylaminobutane, also alkanolamines such as N-aminoethylethanolamine, ethanolamine, 3-aminopropanol or neopentanolamine. Preference is given to diethanolamine and/or hydrazine and/or isophoronediamine (IPDA) and/or ethylenediamine. Particular preference is given to hydrazine and/or isophoronediamine and/or ethylenediamine. Most particular preference is given to a mixture of hydrazine hydrate and IPDA.

According to the invention water is used as component E.

The preparation of the polyurethane ureas used in the method according to the invention can be carried out by various processes known in principle in the prior art. The following processes have been found to be particularly suitable:

1. The so-called "acetone process" according to the teaching of DE-OS 1 495 745, U.S. Pat. No. 3,479,310, according to which an NCO-terminal prepolymer is prepared in the melt, is dissolved in a suitable solvent and is converted, in solution, into a polyurethane with a chain extension component. When the solution of the polyurethane has been mixed with water, the polyurethane dispersion is obtained by removing the solvent by distillation. By means of this process it is possible to synthesise substantially linear polyurethanes, because crosslinked systems readily gel in the organic phase.

2. A process for the preparation of polyurethane-based dispersions using blocked amines or hydrazines as chain extenders is described in DE-OS 2 725 589, U.S. Pat. Nos. 4,269,748, 4,192,937 or 4,292,226. In this process, a hydrophilic, terminal, NCO-group containing prepolymer is mixed with at least partially blocked amines or hydrazines in the absence of water, and then water is added to the mixture, whereby the previously blocked amine or hydrazine is freed and reacts as the chain extender of the prepolymer. According to this process, aromatic diisocyanates can also be used to form the NCO-terminal prepolymers.

3. A further suitable procedure comprises chain-extending the NCO-terminal prepolymers in an aqueous medium by dispersing the hydrophilic prepolymers in water and then adding the chain extender. To form the dispersion it is possible to add either the water to the prepolymer or the prepolymer to the water. When aromatically bonded NCO end groups are used, it is preferred to mask the isocyanate groups before water is added, as is described in U.S. Pat. No. 4,387,181.

Practical tests have shown that particularly good results are achieved when the acetone process (1) is used to prepare the polyurethane ureas.

The dispersion of the polyurethanes can in principle be carried out by any desired processes. These include, for example, dispersion by mixing the polyurethane melts with water in devices capable of producing high shear gradients. In principle it is also possible to use small amounts of solvent for plastification during processing in the mentioned devices, as well as non-mechanical dispersing agents, such as sound waves of extremely high frequency. However, simple mixers, for example stirrer vessels or so-called reflux mixers, can also be used if the polyurethanes are themselves dispersible.

In general, the amounts of starting components A to E are such that anionically modified polyurethane ureas having from 5 to 35, preferably from 10 to 30, mmol of anionic groups/100 g of polyurethane urea and dispersions having a solids content of from 20 to 60 wt. % are obtained.

The functionalities of components B to D are so chosen that the mean total functionality according to the claims is obtained.

In the method according to the invention, the polyurethane urea is used in the form of an aqueous dispersion. The solids content of the aqueous dispersion can be varied within wide ranges. Particularly good results are obtained when the solids content of the aqueous dispersion is from 30 to 50 wt. %, in particular from 35 to 45 wt. %.

The aqueous dispersion can additionally contain conventional additives such as agents for improving handle, pigments, colourings, antioxidants, in particular phenolic antioxidants, hydrophobising agents, curing agents, fillers, flameproofing agents, flow improvers, surface-active compounds, stabilisers, in particular light stabilisers, biocides and/or thickeners.

Suitable crosslinkers, such as in particular polyisocyanates, can also be present in the formulation. Particularly suitable crosslinkers are aliphatic and/or aromatic polyisocyanates and/or blocked aromatic polyisocyanates which have at least two NCO functions, preferably three or more NCO functions. The blocked or non-blocked polyisocyanates can be used solvent-free or in the form of solutions. Suitable blocking agents for the polyisocyanates are ketoximes, for example methyl ethyl ketoxime, diisobutyl ketoxime, also CH-acidic compounds, such as malonic esters, acetic esters or phenols such as, for example, phenol, nonylphenol and other blocking agents such as caprolactam. Polyisocyanates of the mentioned type are, inter alia, biuretised, optionally uretdione-containing polyisocyanates of aliphatic or cycloaliphatic diisocyanates such as hexane diisocyanate and/or isophorone diisocyanate, cyanurates of hexane diisocyanate, isophorone diisocyanate, 2,4-/2,6-toluoylene diisocyanate, or optionally mixtures of such polyisocyanates or mixed-polymerised polyisocyanates. Also suitable are reaction products of trimethylolpropane, glycerol, pentaerythritol or other polyols in admixture with dialcohols such as diethylene glycol, 1,4-butanediol, dipropylene glycol and other diols with a molar excess of toluoylene diisocyanates, diphenylmethane diisocyanates or isomeric mixtures thereof, also reaction products of dialcohols such as di- and tri-ethylene glycol, di- and tri-propylene glycol with molar excess amounts of toluylene diisocyanates or diphenylmethane diisocyanates, on their own or in a mixture.

The NCO content of the polyisocyanates having NCO groups in free or blocked form is preferably from 5 to 35%, more preferably from 10 to 20%. Preferred blocking agents are butanone oxime, acetic acid alkyl esters and/or malonic acid alkyl esters.

When polyurethane dispersions are used, in particular NCO-blocked, preferably aliphatic, polyisocyanates are used as crosslinkers.

The dispersion containing aqueous, anionically modified polyurethane ureas can be applied to the sheet-form textile material by a very wide variety of processes. Practical tests have shown that the application of the aqueous dispersion can be carried out particularly advantageously by direct coating, reverse coating processes, lamination, atomisation, immersion, printing, spraying and/or knife coating.

The aqueous dispersion is then cured advantageously at temperatures of from 70 to 160° C. and forms an adhesive coat on the sheet-form textile material. Yet more preferably, curing takes place in a plurality of temperature zones, preferably three temperature zones, of approximately from 70° C. to 90° C. (first temperature zone), from 90° C. to 110° C. (second temperature zone) and from 140° C. to 160° C. (third temperature zone).

A particularly stable coating is obtained when a multilayer laminate is formed. On account of its excellent adhesion-promoting action, the layer formed from the anionically modified polyurethane ureas advantageously acts as the adhesive coat. To the side of the adhesive coat remote from the sheet-form textile material there is preferably applied a top coat. Yet more preferably, an intermediate coat is preferably formed between the top coat and the adhesive coat. A composite of pre-top coat, top coat and adhesive coat is also possible.

If a coating of two or more coats, for example top coat and adhesive coat, top coat, intermediate coat and adhesive coat or pre-top coat, top coat and adhesive coat, is to be formed, application by the reverse coating process has been found to be most particularly suitable. The amount of solid applied per coat is generally from 20 to 60 g/m$^2$.

For the preparation of the top coat, pre-top coat and intermediate coat solutions, it is possible to use conventional polyurethane solutions, polyurethane dispersions or polyurethane reactive systems, optionally also other polymers, for example PVC.

For the preparation of a reverse coating by the method according to the invention, the individual layers are advantageously applied to a temporary support, preferably release papers or silicone matrices optionally carrying a pattern, and are solidified by drying at elevated temperatures, in most cases from 90 to 160° C., and finally the adhesive coat of the polyurethane preparation is applied, for example by means of knife coating, for example in thicknesses of from 15 to 50 g/m$^2$, preferably from 15 to 35 g/m$^2$, and is likewise dried, for example at temperatures up to 100° C., in particular at temperatures of from 70 to 90° C., by passage through a drying tunnel.

The textile substrate (for example nonwovens, knitted fabrics, woven fabrics, filled nonwovens, preferably nonwovens filled with microporously produced coagulates) is advantageously covered with the dry adhesive coat on a cylinder by the application of rollers and is then crosslinked thermally at temperatures of up to approximately 180° C., preferably from 120 to 160° C. After removal of the release paper, the coated material is present.

By means of a reverse coating it is particularly simple to produce, for example, velvet-like coatings using silicone matrices and suitable temperature management.

As already mentioned, the polyurethane suspensions according to the invention can, however, also be applied directly to the textile substrate in the direct coating process. With applied amounts of approximately from 50 to 200 g/m$^2$ it is thus possible, depending on the intended use, to produce, for example, a coating for sportswear or tarpaulins, conveyor belts, life jackets, etc. with coatings of different thicknesses.

The present invention further provides the use of an aqueous dispersion containing anionically modified polyurethane ureas comprising
A. aromatic diisocyanate,
B. polyether polyol having a mean molecular weight greater than 1500,
C. at least one compound containing from 1 to 2 isocyanate-reactive groups and at least one ionogenic group,
D. polyamine having a mean molecular weight of at least 32, and
E. water,
wherein the mean total functionality of the isocyanate-reactive compounds B to D is from 1.85 to 2.2, the molar ratio of the isocyanate groups of component A to the isocyanate-reactive groups of components B to D is greater than 1, and the polyurethane ureas have a content of from 800 to 1500 mmol of urethane groups/kg of anionically modified polyurethane urea and a content of from 800 to 1800 mmol of urethane plus urea groups/kg of anionically modified polyurethane urea, in the coating of a sheet-form textile material.

Excellent coating results are achieved when the aqueous dispersion is used in one of the processes described above.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Example 1

An aqueous dispersion containing anionically modified polyurethane ureas is prepared according to Example 3 of EP 0 581 159 B1. To that end, 1.380 g of a polypropylene oxide diol (OH number=56) and 65 g of dimethylolpropionic acid are dewatered for 60 minutes at 110° C. and 15 mbar. At 90° C., 266 g of a 35:65 mixture of 2,6- and 2,4-toluoylene diisocyanate are added. After 5 hours, an isocyanate content of 1.55% has been reached. Dilution with 3,300 g of acetone is carried out. 12.25 g of ethylenediamine in 160 g of water are added to the acetone solution at 55 to 65° C. The mixture is then neutralised with 35 g of triethylamine, and 4.0 g of water are added. Removal of the acetone by distillation yields a finely divided dispersion having the following data:

| 30.5 wt. % solid | |
|---|---|
| pH = | 7.7 |
| urethane groups: | 1335 mmol/kg |
| urea groups: | 332.00 mmol/kg |
| total: | 1667 mmol/kg |

The product has a Shore A hardness of 49; it is completely soluble in THF (clear solution) and has a viscosity in THF of 17 s.

Example 2

A textile support of a cotton/polyester mixture is coated in the reverse coating process with an adhesive coat prepared from that dispersion, an intermediate coat arranged on the adhesive coat, a top coat arranged on the intermediate coat, and a finish coat.

The laminate obtained in that manner is investigated in respect of wet adhesion and dry adhesion and compared with laminates of the same structure whose adhesive coats had been prepared using solvent-containing polyurethane solutions or an aqueous dispersion conventional in textile coating (Impranil DLU). Impranil DLU is an aliphatic dispersion which differs significantly from the dispersion according to the invention in terms of its structural components, the amount of urethane and urea groups and the hydrophilicity.

The products shown in Table 1 are used to prepare the laminates.

TABLE 1

| Products | Definition |
|---|---|
| Impranil EWN 13, Bayer AG, Leverkusen | polyurethane urea dissolved in DMF, MEK, toluene |
| Impranil DLU, Bayer AG, Leverkusen | aqueous polyurethane urea dispersion |
| Desmodur XP 2410, Bayer AG, Leverkusen | aliphatic polyisocyanate |
| Imprafix TH solution, Bayer AG, Leverkusen | aromatic polyisocyanate |
| Bayderm Black B, Bayer AG, Leverkusen | coloured pigment |

TABLE 1-continued

| Products | Definition |
| --- | --- |
| Euderm Black B, Bayer AG, Leverkusen | coloured pigment |
| Borchigel ALA, Borchers, Dormagen | acrylate-based thickener |
| Impranil LP RSC 1997, Bayer AG, Leverkusen | aliphatic polyurethane dispersion |
| Euderm colour mixture | 92.5 wt. % Euderm White CG-N, 6.5 wt. % Caramel C-N, 0.5 wt. % Euderm Black C-N, 3.0 wt. % Euderm Dark Brown C-N (each Lanxess AG, Leverkusen) |
| Impranil HS-80, Bayer AG, Leverkusen | solvent-containing prepolymer with blocked isocyanate groups |
| Flow mixture | Baysilon OL17 lacquer additive, Lanxess, Leverkusen, Acronal 700 S, polyacrylate, BASF AG, Ludwigshafen and Tinuvin B75, blend of a light stabiliser and antioxidant, Ciba AG, Basle |
| Arbocel BE 30/600, Rettenmeier, Germany | cellulose powder |
| Imprafix VP LS 2330, Bayer AG, Leverkusen | polyamine for crosslinking |
| Mirox AM, Stockhausen, Krefeld | acrylate thickener |
| Acrafix ML, Lanxess, Leverkusen | melamine resin |

Preparation and Composition of the Individual Coats

The coatings are prepared by the transfer process on a 1-coat coating machine from ISOTEX.

a) Finish

Table 2 shows the composition of the finish coats used to prepare laminates 1 to 6.

TABLE 2

| Finish | Laminate 1 | Laminate 2 | Laminate 3* | Laminate 4 | Laminate 5 | Laminate 6* |
| --- | --- | --- | --- | --- | --- | --- |
| Impranil LP RSC 1997 | 1000 | 1000 | 1000 | 1000 | 1000 | 1000 |
| Borchigel ALA | 20 | 20 | 20 | 20 | 20 | 20 |
| Desmodur XP 2410 | 20 | 20 | 20 | 20 | 20 | 20 |

(*according to the invention)

Impranil LP RSC 1997 is placed in a container and thickened to coating viscosity with Borchigel ALA, with stirring; Desmodur XP 2410 is added, with stirring, and incorporated homogeneously. Coating is carried out at a running speed of 2.0 n/min with a knife gap of 0.04 mm and a solid of 18 g/m². Drying is carried out in three temperature zones of 80° C., 100° C. and 150° C. in the course of four minutes.

b) Top Coat

Table 3 shows the composition of the top coats used to prepare laminates 1 to 6.

TABLE 3

| Top coat | Laminate 1 | Laminate 2 | Laminate 3* | Laminate 4 | Laminate 5 | Laminate 6* |
| --- | --- | --- | --- | --- | --- | --- |
| Impranil DLU Dispersion | 1000 | 1000 | 1000 | 1000 | 1000 | 1000 |
| Euderm colour mixture | 120 | 120 | 120 | 120 | 120 | 120 |
| Borchigel ALA | 20 | 20 | 20 | 20 | 20 | 20 |

(*according to the invention)

Impranil DLU dispersion is placed in a container; the Euderm colour mixture is added, with stirring, and the mixture is thickened to coating viscosity with Borchigel ALA, with stirring, and incorporated homogeneously. Coating is carried out at a running speed of 2.0 m/min with a knife gap of 0.07 mm and a solid of 40 g/m². Drying is carried out in three temperature zones of 80° C., 100° C. and 150° C. in the course of four minutes.

c) Intermediate Coat

Table 4 shows the composition of the intermediate coats used to prepare laminates 1 to 6.

TABLE 4

| Intermediate coat | Laminate 1 | Laminate 2 | Laminate 3* | Laminate 4 | Laminate 5 | Laminate 6* |
| --- | --- | --- | --- | --- | --- | --- |
| Impranil HS-80 | 1000 | 1000 | 1000 | | | |
| Bayderm White CG-N | 100 | 100 | 100 | | | |
| Flow improver mixture | 25 | 25 | 25 | | | |
| Arbocel BE 30/600 | 50 | 50 | 50 | | | |
| Imprafix VP LS 2330 | 70 | 70 | 70 | | | |
| Impranil DLU dispersion | | | | 1000 | 1000 | 1000 |
| Euderm White CG-N | | | | 100 | 100 | 100 |
| Mirox AM | | | | X | X | X |
| Ammonia solution, conc. to pH 8-9 | | | | X | X | X |
| Acrafix ML | | | | 25 | 25 | 25 |

(*according to the invention)

For the preparation of the intermediate coats for comparison laminates 1 and 2 and for laminate 3 according to the invention, Impranil HS-80 is placed in a container; flow improver mixture, Arbocel BE 30/600, Bayderm White CG-N and Imprafix VP LS 2330 are then added, with stirring, and incorporated homogeneously. The homogeneous mixture is ground over a three-roll mill and then freed of air bubbles in a deaeration device. Coating is carried out at a running speed of 2.0 m/min with a knife gap of 0.40 mm and a solid of 267 g/m². Drying is carried out in three temperature zones of 160° C., 160° C. and 150° C. in the course of four minutes.

For the preparation of the intermediate coat for comparison laminates 4 and 5 and for laminate 6, Impranil DLU dispersion is placed in a container; Euderm White CG-N, Acrafix ML and ammonia solution conc. to pH 8-9 are then added, with stirring, and the mixture is thickened to coating viscosity with Mirox AM. Coating is carried out at a running speed of 1.5 m/min with a knife gap of 0.50 mm and a solid of 280 g/m². Drying is carried out in three temperature zones of 70° C., 90° C. and 130° C.

d) Adhesive Coat

Table 5 shows the composition of the adhesive coats used to prepare laminates 1 to 6.

TABLE 5

| Adhesive coat | Laminate 1 | Laminate 2 | Laminate 3* | Laminate 4 | Laminate 5 | Laminate 6* |
| --- | --- | --- | --- | --- | --- | --- |
| Impranil EWN 13 | 1000 | | | 1000 | | |
| Imprafix TH solution | 20 | | | 20 | | |

TABLE 5-continued

| Adhesive coat | Laminate 1 | Laminate 2 | Laminate 3* | Laminate 4 | Laminate 5 | Laminate 6* |
|---|---|---|---|---|---|---|
| Bayderm Black B | 20 | | | 20 | | |
| Impranil DLU dispersion | | 1000 | | | 1000 | |
| Adhesive coat from Exemplary embodiment 1 | | | 1000 | | | 1000 |
| Euderm Black B | | 20 | 20 | | 20 | 20 |
| Borchigel ALA | | 30 | 20 | | 30 | 20 |
| Desmodur XP 2410 | | 20 | 20 | | 20 | 20 |

(*according to the invention)

For the preparation of the adhesive coat for comparison laminates 1 and 4, Impranil EWN 13 is placed in a container; Imprafix TH solution and Bayderm Black B are then incorporated homogeneously, with stirring. Coating is carried out at a running speed of 2.0 m/min with a knife gap of 0.15 mm and a solid of 40 g/m². Drying is carried out in three temperature zones of 80° C., 100° C. and 150° C. in the course of four minutes.

For the preparation of the adhesive coat for comparison laminates 2 and 5, Impranil DLU dispersion is placed in a container; Euderm Black B is then added, with stirring, and the mixture is thickened to coating viscosity with Borchigel ALA, with stirring, and then Desmodur XP 2410 is added, with stirring, and incorporated homogeneously. Coating is carried out at a running speed of 2.0 m/min with a knife gap of 0.11 mm and a solid of 40 g/m². Drying is carried out in three temperature zones of 80° C., 100° C. and 150° C. in the course of four minutes.

For the preparation of the adhesive coat for laminates 3 and 6 according to the invention, the polyurethane solution from Exemplary embodiment 1 is placed in a container; Buderm Black B is then added, with stirring, and the mixture is thickened to coating viscosity with Borchigel ALA, with stirring, and then Desmodur XD 2410 is added, with stirring, and incorporated homogeneously. Coating is carried out at a running speed of 2.0 m/min with a knife gap of 0.15 mm and a solid of 40 g/m². Drying is carried out in three temperature zones of 80° C., 100° C. and 150° C. in the course of four minutes.

Results

The dry adhesion and wet adhesion of the laminates prepared as above is tested using a device of the Z 1.0/TH1S type from Zwick. Testing is carried out on test specimens having a size of 200 mm×15 mm, at a pull speed of 100 mm per minute. To that end, a cotton stiffener provided with the coating is uniformly ironed onto the test surface at a temperature of 180° C. until adhesion or melting is discernible. Before the test, the test specimen is allowed to react fully for at least 24 hours.

The results are shown in Table 6.

TABLE 6

| Adhesive coat | Laminate 1 | Laminate 2 | Laminate 3* | Laminate 4 | Laminate 5 | Laminate 6* |
|---|---|---|---|---|---|---|
| Adhesion dry [N/2.5 cm] | 26 | 20 | 26 | 17 | 16 | 28 |
| Adhesion wet [N/2.5 cm] | 12 | 17 | 20 | 14 | 14 | 18 |

(*according to the invention)

As will be seen, only laminates 3 and 6 according to the invention exhibit adequate adhesion values compared with the solvent-containing standard (comparison laminates 1 and 4).

The invention claimed is:

1. A method for coating a sheet-form textile material, comprising applying an aqueous dispersion which comprises an anionically modified polyurethane urea prepared from
   A. an aromatic diisocyanate;
   B. a polyether polyol having a mean molecular weight of greater than 1500;
   C. at least one compound containing from 1 to 2 isocyanate-reactive groups and at least one ionogenic group;
   D. a polyamine having a mean molecular weight of at least 32; and
   E. water;
wherein the mean total functionality of B, C, and D is in the range of from 1.85 to 2.2, the molar ratio of the isocyanate groups of A to the isocyanate-reactive groups of B, C, and D is greater than 1, and said anionically modified polyurethane urea contains in the range of from 800 to 1500 mmol of urethane groups/kg of anionically modified polyurethane urea and in the range of from 800 to 1800 mmol of urethane plus urea groups/kg of anionically modified polyurethane urea;
to a sheet-form textile material.

2. The method of claim 1, wherein said anionically modified polyurethane urea contains in the range of from 1200 to 1750 mmol of urethane plus urea groups/kg of anionically modified polyurethane urea.

3. The method of claim 1, wherein said anionically modified polyurethane urea contains more than 150 mmol of urea groups/kg of anionically modified polyurethane urea.

4. The method of claim 1, wherein said anionically modified polyurethane urea contains more than 200 mmol of urea groups/kg of anionically modified polyurethane urea.

5. The method of claim 1, wherein the molar ratio of the isocyanate groups of A to the isocyanate-reactive groups of B, C, and D is greater than 1.05.

6. The method of claim 1, wherein said anionically modified polyurethane urea has a Shore A hardness of not more than 60.

7. The method of claim 1, wherein said aqueous dispersion has a solids content of from 30 to 50 weight %.

8. The method of claim 1, wherein said aqueous dispersion has a solids content of from 35 to 45 weight %.

9. The method of claim 1, further comprising curing said aqueous dispersion at a temperature in the range of from 70° C. to 160° C. to form an adhesive coat.

10. The method of claim 9, further comprising applying a top coat to the side of said adhesive coat that is remote from the sheet-form textile material.

11. The method of claim 1, wherein said aqueous dispersion is applied to said sheet-form textile material by direct coating, reverse coating, lamination, atomisation, immersion, printing, spraying, and/or knife coating.

12. The method of claim 1, wherein said aqueous dispersion further comprises crosslinkers and/or curing agents, fillers, flameproofing agents, flow improvers, surface-active compounds, stabilisers, biocides, and/or thickeners.

13. The method of claim 1, wherein said sheet-form textile material is a woven fabric, a nonwoven fabric, or a knitted fabric.

14. A coating on a sheet-form textile material comprising the anionically modified polyurethane urea prepared from
- A. an aromatic diisocyanate;
- B. a polyether polyol having a mean molecular weight of greater than 1500;
- C. at least one compound containing from 1 to 2 isocyanate-reactive groups and at least one ionogenic group;
- D. a polyamine having a mean molecular weight of at least 32; and
- E. water;

wherein the mean total functionality of B, C, and D is in the range of from 1.85 to 2.2, the molar ratio of the isocyanate groups of A to the isocyanate-reactive groups of B, C, and D is greater than 1, and said anionically modified polyurethane urea contains from 800 to 1500 mmol of urethane groups/kg of anionically modified polyurethane urea and from 800 to 1800 mmol of urethane plus urea groups/kg of anionically modified polyurethane urea.

* * * * *